United States Patent [19]

Kowalski et al.

[11] Patent Number: 5,015,096

[45] Date of Patent: May 14, 1991

[54] METHOD AND APPARATUS FOR TESTING OPTICAL COMPONENTS

[76] Inventors: Frank V. Kowalski, 209 Kimball Ave., Golden, Colo., 80401; Thomas E. Milner, 770 N. Dodge, Apartment 31, Tucson, Ariz., 85716

[21] Appl. No.: 261,144

[22] Filed: Oct. 24, 1988

Related U.S. Application Data

[63] Continuation-in-part of Ser. No. 917,487, Oct. 10, 1986, abandoned.

[51] Int. Cl.$^5$ ............................................. G01B 11/30
[52] U.S. Cl. ...................................... 356/371; 350/6.6; 356/124
[58] Field of Search ........................ 356/124, 371, 445; 350/6.5, 6.6

[56] References Cited

U.S. PATENT DOCUMENTS

| | | | |
|---|---|---|---|
| 3,775,012 | 11/1973 | Ling et al. | 356/400 |
| 3,885,875 | 5/1975 | Rosenfeld et al. | 356/376 |
| 3,977,789 | 8/1976 | Hunter et al. | 356/124 |
| 4,266,847 | 5/1981 | Menke | 350/6.6 |
| 4,427,295 | 1/1984 | Nishiyama | 356/371 |

FOREIGN PATENT DOCUMENTS 894953 4/1962 United Kingdom ................ 356/445

Primary Examiner—Richard A. Rosenberger

[57] ABSTRACT

A method and apparatus for scanning and testing optical components is disclosed. An incident laser beam is directed at a trihedral retroreflector and is redirected by the trihedral retroreflector onto a test surface. The trihedral retroreflector is movable in X and Y directions over the test surface, in a plane perpendicular to the incident beam, scanning the incident beam over the test surface. The reflected beam from the test surface is redirected by the trihedral retroreflector to measurement instrumentation including a photodetector. If the test surface is planar, the reflected beam retraces the path of the incident beam independent of the translation of the trihedral retroreflector. Irregularities in the test surface cause deflections of the reflected beam. The linear scanning range, in both X and Y direction, of a single trihedral retroreflector of diameter "d" is the value (d times 2). The linear scanning range of a series of "n" trihedral retroreflectors of diameter "d" is the value (d times $2^n$).

17 Claims, 2 Drawing Sheets

METHOD AND APPARATUS FOR TESTING OPTICAL COMPONENTS

BACKGROUND OF THE INVENTION

This invention is a continuation-in-part of my co-pending U.S. patent application Ser. No. 917,487 filed Oct. 10, 1986 under the title METHOD AND APPARATUS FOR TESTING OPTICAL COMPONENTS, now abandoned.

1. Field of the Invention

The subject matter of this invention is optics, and relates more particularly to an optical method and apparatus for scanning and testing the quality of refractive and reflective optical components.

The standard technique for testing the quality of optical components is interferometry. The fundamental limits of sensitivity of this method are determined by "shot noise" in the light beam over the area being tested, and by the quality of the optical components of the interferometer.

The current standard instrument used in industry for testing of optical components is the Twyman-Green interferometer. This device has certain inherent limitations. To begin with, it produces a fringe pattern from which it is difficult to extract quantitative information. Second, the fringe pattern has proven to be quite sensitive to vibration of the interferometer. Finally, its sensitivity is limited to approximately one one-hundredth of a fringe.

2. Description of the Related Art

British Patent No. 894,953 to Schafer et al, published Apr. 26, 1962, is the most relevent prior art we know of. Schafer et al discloses an optical surface test apparatus in which a test surface is scanned, one line at a time, by a laser beam. The incident laser beam is directed at a two-surface reflector, or roof reflector, which redirects the incident beam onto the test surface. The roof reflector is moved in one direction along an X axis, causing the incident laser beam to scan a single line on the test surface. At the end of each scan, the test surface is displaced a small amount in the Y direction, whereupon the incident beam is then scanned again in the X direction. In short, the light beam is scanned back and forth, and the test object is incrementally displaced at the end of each line scan.

SUMMARY OF THE INVENTION

In summary, the present invention is a method and apparatus for scanning and testing optical components. An incident laser beam is directed at a trihedral retroreflector and is redirected by the trihedral retroreflector onto a test surface. The trihedral retroreflector is movable in X and Y directions over the test surface, in a plane perpendicular to the incident beam, scanning the incident beam over the test surface. The reflected beam from the test surface is redirected by the trihedral retroreflector to measurement instrumentation. If the test surface is planar, the reflected beam retraces the path of the incident beam independent of the translation of the trihedral retroreflector. Irregularities in the test surface cause deflections of the reflected beam. The linear scanning range, in both X and Y directions, of a single trihedral retroreflector of diameter "d" is the value (d times 2). The linear scanning range of a series of "n" trihedral retroreflectors of diameter "d" is the value (d times $2^n$).

It is an object of this invention to provide an improved and more accurate method and apparatus for testing optical components.

Another object is to provide a method and apparatus for testing optical components which is considerably simpler and less expensive than prior art devices based upon interferometric techniques.

Another object is to provide an optical component testing apparatus in which a movable light beam is translated relative to a stationary test component.

DESCRIPTION OF THE PREFERRED EMBODIMENTS

Figure 1:
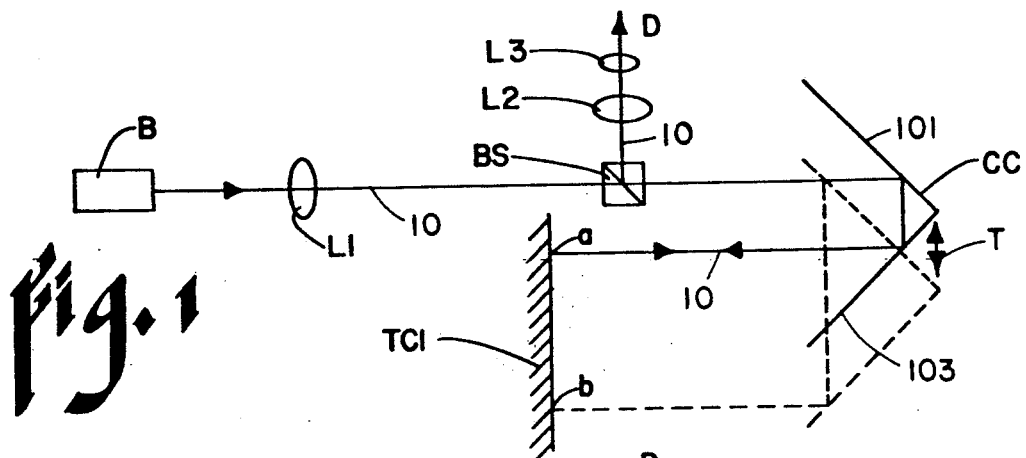
FIG. 1 is a schematic diagram of this invention in one form, utilizing a single trihedral retroreflector to test a flat mirror.

Referring to FIG. 1, the apparatus of this invention includes the following, disposed along an optical path 10: a source of radiant energy such as a helium-neon laser B; a focusing lens L1; a beam splitter BS; a trihedral retroreflector CC; and a planar reflective test surface TC1 at the focal plane of lens L1. A branch of the optical path 10 extends from the beam splitter BS and includes a telescope L2/L3 and a photodetector D in optical alignment. Laser B directs a light beam along the optical path 10. The light beam traverses the beam splitter BS and is displaced and redirected by the trihedral retroreflector CC for incidence on the test surface TC1. The incident beam is focused to a point on the test surface TC1 by the lens L1. The incident beam is reflected by the test surface, back through the trihedral retroreflector CC, to the beam splitter BS which directs part of this reflected beam along the branch optical path to telescope L2/L3 and to photodetector D which senses deflections of the reflected beam. Telescope L2/L3 between the beam splitter BS and the photodetector D is for the purpose of magnifying the angular deviations in the beam due to defects in the test component TC1. In the telescope, L2 is the objective and L3 is the eyepiece.

A transport mechanism, schematically represented at T, reciprocates the trihedral retroreflector CC in a plane perpendicular to the axis of the incident beam, as indicated. The transport mechanism T also raises the trihedral retroreflector incrementally after each excursion so that the redirected incident beam sweeps a different path across the test surface TC1. The transport mechanism T, used to translate and lift the trihedral retroreflector, is by itself not new. Such equipment is commercially available. The same is true of the photodetector D which can take any one of several forms which are commercially available. Photodetector D might be either a large area photodiode or a multiple diode array to indicate beam deflection. Both the multiple diode photodetector and the large area photodetector have the capability of sensing deflections in two directions. The orthogonal directions of movement of the trihedral retroreflector will be designated as X and Y directions for convenient reference.

Figure 3:
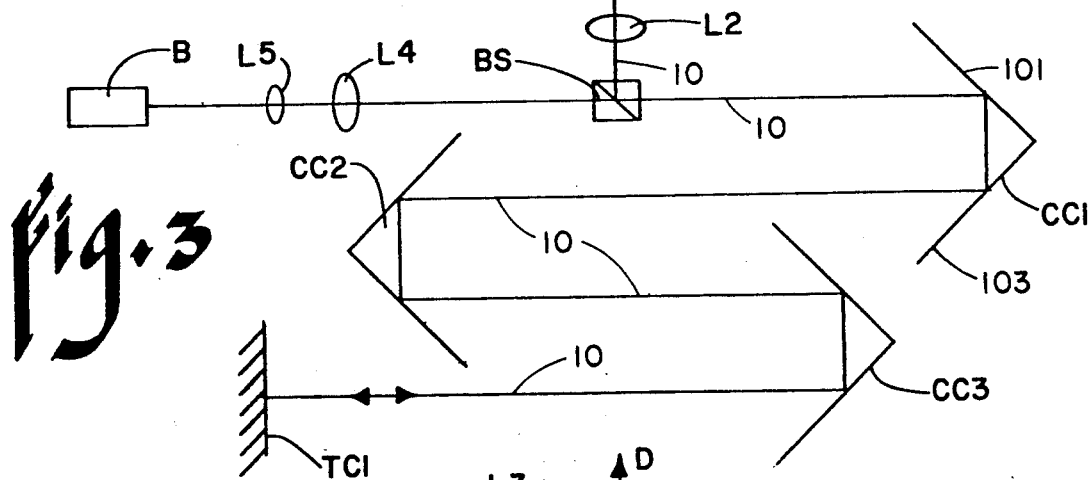
FIG. 3 is a further modification of the FIG. 1 system in which a plurality of trihedral retroreflectors are used to cover a larger area flat mirror.
Figure 4:
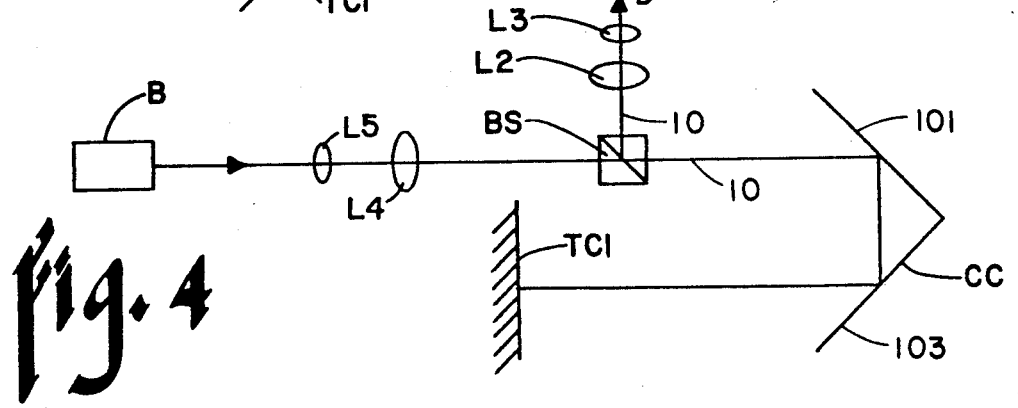
FIG. 4 is a still further modification of the apparatus wherein a second telescope replaces a lens of the embodiment of FIG. 1.
Figure 5:
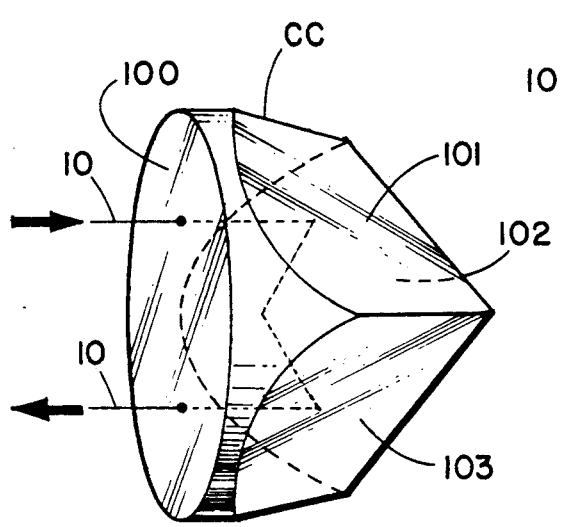
FIG. 5 is a perspective side view of a trihedral retroreflector.
Figure 6:
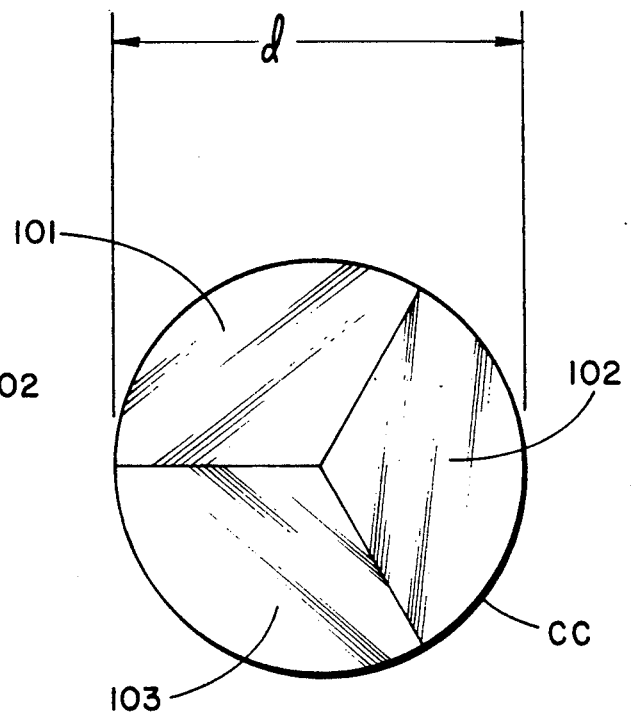
FIG. 6 is a right end view of the trihedral retroreflector of FIG. 5.

The key component in the system is the trihedral retroreflector CC, represented schematically in FIGS. 1-4 but shown more fully in FIGS. 5 and 6. Trihedral retroreflector CC includes an entrance/exit face 100 and three mutually perpendicular internally reflecting faces 101, 102 and 103. This geometry is the same as that formed by the juncture of two walls and a ceiling. The trihedral retroreflector has the property that any light ray entering its effective aperture is reflected and emerges from the entrance/exit face parallel to itself, propagating in the opposite direction. An incident beam exactly filling the effective aperture is reflected exactly back on itself. These properties are, within acceptance angle limits, independent of the orientation of the retroreflector.

The trihedral retroreflector is positioned in the optical path 10 of the stationary light beam. The incident beam from laser B is redirected by the trihedral retroreflector CC onto the test component TC1 as shown. The trihedral retroreflector CC is movable in X and Y directions in a plane Perpendicular to the light beam to scan the redirected incident beam over the two-dimensional area of the stationary test component. As the trihedral retroreflector is moved from the full line position shown in FIG. 1 to its phantom line position, the point of incidence on the test surface TC1 moves from point "a" to point "b". The path length of the light beam, however, remains constant and independent of the translation of the cube CC so long as the translation is in a plane perpendicular to the axis of the incident beam. This is one of the advantages of a trihedral retroreflector. The constant path length keeps the beam parameters on the test surface the same during scanning.

The trihedral retroreflector CC is illustrated and described above as a solid optical component operating by total internal reflection. It may be desirable to use instead three mutually orthogonal mirrors. In any case, it is recognized that the one form is the optical equivalent of the other.

Referring briefly to FIG. 3, another advantage of the trihedral retroreflector is that several of them can be arranged in series (CC1, CC2 and CC3) thereby multiplying the effective scanning range. If "d" is the diameter of each trihedral retroreflector, the linear scanning range of one such reflector in any direction is 2d. With two trihedral retroreflectors in series, this range is 4d. With three reflectors it is 8d, and so on, the coefficient of d relating to the number "n" of trihedral retroreflectors as $2^n$. That is, the linear scanning range of a series of "n" trihedral retroreflectors of diameter "d" is the value d times $2^n$. An even number of trihedral retroreflectors not only enables scanning of a large surface area, but facilitates it as well because the incident beam, as finally redirected, is propagating in its original direction. This alleviates problems of mechanical interference and "packaging."

A trihedral retroreflector is itself a known optical component in the prior art. A trihedral retroreflector is not a specialized roof reflector. It is as different from a roof reflector as a roof reflector is different from a plane mirror. The function of a trihedral retroreflector cannot be performed by a roof reflector. The reason for this is fundamental. The trihedral retroreflector has the property that, within acceptance angle limits, any incident light ray is retroreflected to emerge parallel to itself. This property is independent of the orientation of the trihedral retroreflector vis a vis the incident light ray. Because of this characteristic, the trihedral retroreflector is insensitive to anomalies in the translating mechanism used to move it back and forth over the test object. In a roof reflector, on the other hand, only an incident ray normal to the roof apex is reflected parallel to itself, and so a roof reflector system is quite sensitive to such mechanical anomalies. In a moving roof reflector system such as Schafer et al, any mechanical irregularities or anomalies that would result in the mirrors tilting forward or backward will appear as aberrations in the test surface, since the detector cannot discriminate between the latter and some imperfection in the translating mechanism itself.

It is immaterial whether the trihedral retroreflector tilts forward, backward or from side-to-side as it traverses the test surface. The trihedral retroreflector therefore makes the system insensitive to the condition of the translating mechanism. The significant effect of this is that any deviation seen in the reflected beam is necessarily caused by irregularities in the test surface itself, not in any other part of the system. It is for this reason that a resolution of 0.8 A, which is several orders of magnitude better than that heretofore obtainable by any other method, has been realized by the method and apparatus of this invention. It is important to note in this connection that, while the translating mechanisms for moving the trihedral retroreflector over the face of the test object consist of polished planar beds and precision carriages, yet their flatness and tolerances do not even approach the resolution sought in the optical elements being tested, nor are such mechanical perfections needed in the system of this invention.

By comparison with the three-faceted trihedral retroreflector used in this invention, two-faceted reflectors or roof reflectors used in prior art scanning devices can scan a light beam only in a line, not over an area. In order to scan an area with a redirected beam from a roof reflector it is necessary to move the test surface itself relative to the optical system. Furthermore, a roof reflector is subject to any irregularities in the translating mechanism that would result in mirrors tilting forward or backward. Such tilting will appear as aberrations in the test surface because the photodetector reads only deflections in the reflected beam, and cannot differentiate between deflections caused by anomalies in the test object and those caused by the system moving it about. Accordingly, prior art systems using roof reflectors, such as the Schafer et al system, are dependent upon, and limited by, the precision of the translating system and its ability to keep the reflectors from tilting forward or backward.

There is yet another problem with the roof reflector system of Schafer et al that is not present in the system of this invention, namely that of scanning not just a line but the area of the test surface. Moving the Schafer et al roof reflector in X (right and left) and Y (normal to the drawing) directions over the test surface will not scan the redirected light beam over the area of the test object. It is therefore also necessary to move the test object itself up and down relative to the roof reflector system. Once again, this encounters the problem of irregularities in the mechanical system used to move the test object appearing as an aberration in the test object, since the detector sees only the deflection in the reflected beam and cannot differentiate between such a deflection caused by anomalies in the test object or the system moving it about. In the present invention, moving the trihedral retroreflector in orthogonal directions causes the redirected light beam to sweep the entire area of the test surface. The test object remains stationary. It is not required to move it.

In an incident light beam is other than normal to the entrance face 100 of the trihedral retroreflector CC, there will be refraction of the incident beam at surface 100. Despite this, the retroreflectors 101, 102, and 103 will redirect the incident beam (internally of the trihedral retroreflector), parallel to itself, back to the surface 100. Any refraction occurring when the beam enters at surface 100 also occurs, in reverse, when the retroreflected beam exits surface 100. If the retroreflector CC is in the path of parallel light, then there will be no consequence whatever of any refraction occurring in it. If the retroreflector CC is in the path of diverging light, the only consequence of refraction will be to expand the area of the redirected light beam. Conversely, if the retroreflector CC is in the path of converging light, the only consequence of refraction will be to reduce the area of the redirected light beam.

In a specific example of the system illustrated in FIG. 1, lens L1 with a focal length of 22 cm was positioned 20 cm from a 5 mW He-Ne laser. The test component TC1 was a mirror located 22 cm from lines L1. The trihedral retroreflector CC redirected the laser beam onto the surface of the test component. The redirected incident beam then either reflected directly back and was extracted by beam splitter BS or, alternatively, if the reflected beam was deflected upon a path other than that of the incident beam, it was extracted by a mirror before traversing the objective lens L2 of the telescope. Telescope L2/L3 had a magnification of 10. The transport unit selected to sweep the beam across the test component TC1 was a computer-controlled mount with a 0.1 m position resolution, specifically, a Newport 855-L controller with a 850-2 actuator driving a 435A-2 table. A 7.5 cm diameter trihedral retroreflector was movably mounted atop the table. The light beam displacement on the test surface was twice the displacement of the trihedral retroreflector. After passing through the telescope, the beam was analyzed using a large area position sensing photodiode (Quantrad PS 200-4) with a linearity of 12% over the 2.25 cm diameter. The position of the beam on the latter photodetector was determined by subtracting the photocurrents from the two halves of the split rear contact of the photodiode and then sensing this difference with a lock-in amplifier. In a typical operation, the table was used to step the trihedral retroreflector across the surface of test surface TC1 in four steps. The beam waist on the test surface was 80 μm.

Figure 2:
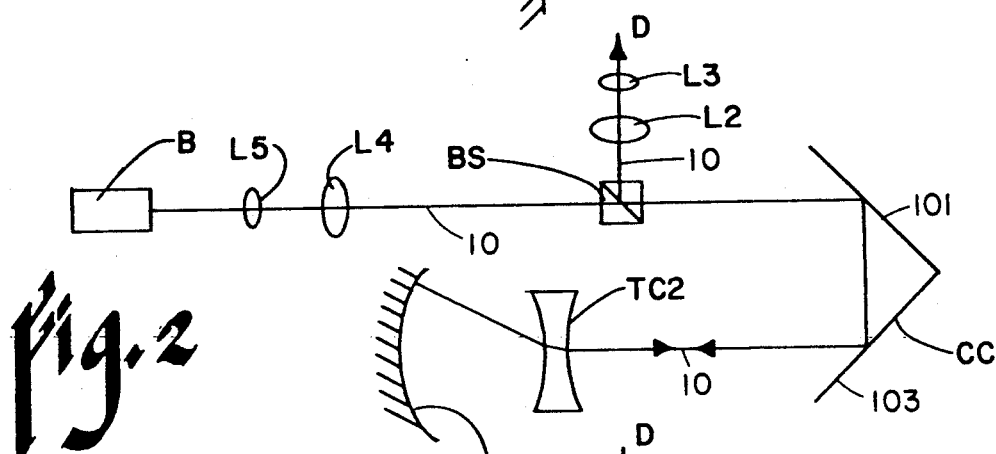
FIG. 2 is a modification of the FIG. 1 system for testing the curvature of a lens or refractive element.

Referring now to FIG. 2, the test component TC2 is a refractive test component in the form of a double concave lens. The incident beam passing through this lens is reflected back through it by a concave spherical mirror M, the center of curvature of the mirror M being at the focal point of the lens TC2. In this arrangement, if the lens has no aberrations, the return beam would be reflected directly back upon itself in the same manner as that of the return beam reflected from TC1 in FIG. 1.

By way of example of a test using the refractive component TC2, one was selected having a focal length of −7 cm and a diameter of 4.5 cm and it was separated from the concave mirror M by 3 cm. This concave mirror had a radius of curvature of 10 cm. The beam was scanned horizontally 9 mm across the lens. The beam size on the lens was 0.47 mm. In this particular test, no telescope was used to increase the dynamic range. The start and end of the scan beam positions were located 4.5 mm from the center of the lens. The beam was displaced vertically ½ mm after each horizontal scan.

FIG. 4 shows yet another variation in which lens L1 has been replaced by a telescope L4/L5, identical to telescope L2/L3. Telescope L4/L5 expands and collimates the laser beam before it reaches the test surface TC4. The return beam is analyzed for deflection by the photodiode array after passing through the telescope L2/L3 which provides angular magnification of any beam deflections caused by aberrations in the test surface TC3.

Referring once again to the apparatus of FIG. 1, the beam forms a waist on the test surface and then reflects to the telescope L2/L3. It is a simple matter to determine the characteristics of the beam which exits a telescope if the size of the beam incident upon the objective is known. Angular magnification of the telescope can be increased if it is desired to enhance beam deflections due to anomalies in the test surface. The effects of this would be a smaller beam waist at the test surface and a larger beam at the photodetector. Accordingly, rather than attempt to calibrate the system by measuring beam parameters, it is preferable to use a standard test surface.

The method and apparatus of this invention are effective to resolve surface slope changes on a test surface of 1 μrad using a beam waist of 80 μm. The measurement of height variations of a test surface is also significant. If an 80 μm waist beam is translated across the test surface, in increments corresponding to the size of its waist on such surface, it can be shown that the resolvable height change will be 0.8 Å.

The resolution of 0.8 Å obtainable through the use of the method and apparatus of this invention is several orders of magnitude better than that obtainable with the best of the present instruments, namely, the Twyman-Green interferometer which is sensitive to one-half wavelength. In terms of the 6328 Å wavelength of He-Ne-laser emission, the Twyman-Green interferometer therefore has a sensitivity limit of about 3000 Å.

The foregoing description of this invention is intended as illustrative. The concept and scope of the invention are limited only by the following claims and equivalents thereof.

What is claimed is:

1. Apparatus for testing an optical test component, including the following disposed along an optical path:
    a source of radiant energy for generating an incident beam and directing said incident beam along said optical path;
    a trihedral retroreflector disposed in said optical path to displace said optical path and to redirect said incident beam therealong onto said test component, and to receive a reflected beam returning from said test component and to redirect said reflected beam back along said optical path;
    detector means to receive said reflected beam for detecting any deviation between said reflected beam and said incident beam; and,
    means for moving said trihedral retroreflector in X and Y directions in a plane perpendicular to said incident beam, to scan said redirected incident beam on the area of said test component.

2. Apparatus as defined in claim 1, further including a beam splitter in said optical path between said source and said trihedral retroreflector to partially reflect said reflected beam along a branch optical path to said detector means.

3. Apparatus as defined in claim 1, further including a focusing lens in said optical path to focus said incident beam upon said test component.

4. Apparatus as defined in claim 1, further including means disposed in said branch optical path for magnifying the deflection of said reflected beam.

5. Apparatus as defined in claim 1, further including a beam expander in said optical path to expand and direct said incident beam onto said test component.

6. Apparatus as defined in claim 1, further including a second trihedral retroreflector disposed in said optical path to further displace said optical path and to further redirect said incident beam therealong onto said optical test component, said second trihedral retroreflector combining with said first-named trihedral retroreflector to substantially double the linear scan range of said apparatus.

7. Apparatus as defined in claim 1, including a number "n" of trihedral retroreflectors disposed in series in said optical path to further displace said optical path and to further redirect said incident beam therealong onto said optical test component, said second trihedral retroreflectors combining to increase the linear scan range of said apparatus, relative to its range with a single trihedral retroreflector, by a factor $2^n$.

8. Apparatus as defined in claim 7, including an even number of trihedral retroreflectors disposed in series to direct said redirected beam in the same direction as said incident beam.

9. A method of testing an optical test component, including the steps of:
   a. directing an incident beam of radiant energy along an optical path at a trihedral retroreflector to displace said optical path and to redirect said incident beam therealong onto the surface of said test component;
   b. scanning said test surface with said redirected incident beam by moving said trihedral retroreflector in X and Y directions over said test surface in a plane perpendicular to said incident beam;
   c. reflecting said incident beam back to said trihedral retroreflector to redirect said reflected beam back along said optical path; and
   d. detecting any deviation between said incident and said reflected beams.

10. A method of testing optical components as defined in claim 9, further including the step of:
   e. focusing said incident beam on the surface being tested.

11. A method of testing optical components as defined in claim 9, further including the step of:
   f. expanding said incident beam directed at said trihedral retroreflector.

12. A method of testing optical components as defined in claim 9, further including the step of:
   g. magnifying the deflection of said reflected beam.

13. A method of testing optical components as defined in claim 9, further including the step of:
   h. scanning said test surface with said redirected incident beam by moving said trihedral retroreflector in an X direction perpendicular to the axis of said incident beam, followed by shifting said trihedral retroreflector incrementally in a Y direction to shift said redirected beam incident relative to said test surface.

14. A method of testing optical components as defined in claim 9, further including the step of:
   i. partially reflecting said reflected beam along a branch optical path onto detector means for detecting any deviation between said incident and said reflected beams.

15. In combination in an apparatus for testing a refractive optical component: means for generating an incident beam of radiant energy; a trihedral retroreflector disposed to intercept said incident beam of radiant energy and redirect the same along a parallel path through said refractive component; a reflective optical component having a reflective surface shaped to match the surface of said refractive component being tested, said reflective component disposed behind said refractive component to intercept said redirected incident beam of radiant energy passing therethrough and to reflect the same back through said refractive component onto said trihedral retroreflector; and means for moving said trihedral retroreflector along a path perpendicular to said incident beam whereby said redirected incident beam is caused to sweep the surface of said refractive component.

16. The combination of claim 15 wherein: the reflective surface of said reflective component has a radius of curvature matching that of said curved surface of the refractive component; and wherein said reflective surface of said reflective component is so positioned that the center of curvature thereof coincides with the focal point of the curved surface of said refractive component.

17. A method of testing a refractive optical component, including the steps of: intercepting an incident beam of radiant energy with a trihedral retroreflector and redirecting said incident beam through said refractive component and onto a reflective optical component positioned therebehind; sweeping said refractive component with said redirected incident beam by moving said trihedral retroreflector relative to said refractive component along a line perpendicular to said incident beam; reflecting said redirected incident beam back through said refractive component and into said trihedral retroreflector; intercepting both said incident beam before it reaches said trihedral retroreflector and said reflected beam reflected from said trihedral retroreflector; and detecting any deviation between the two.

* * * * *